US010064011B2

(12) United States Patent
Zadig

(10) Patent No.: US 10,064,011 B2
(45) Date of Patent: *Aug. 28, 2018

(54) CONTEXT-BASED COMPUTING FRAMEWORK FOR OBTAINING COMPUTING RESOURCE CONTEXT INFORMATION ASSOCIATED WITH A LOCATION

(71) Applicant: AT&T Intellectual Property I, L.P., Atlanta, GA (US)

(72) Inventor: Michael Zadig, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,717

(22) Filed: Jan. 20, 2017

(65) Prior Publication Data

US 2017/0134903 A1 May 11, 2017

Related U.S. Application Data

(60) Continuation of application No. 14/642,231, filed on Mar. 9, 2015, now Pat. No. 9,577,896, which is a division of application No. 13/149,401, filed on May 31, 2011, now Pat. No. 8,996,687.

(51) Int. Cl.
*G06F 15/173* (2006.01)
*H04W 4/02* (2018.01)
*H04L 29/08* (2006.01)

(52) U.S. Cl.
CPC .............. *H04W 4/023* (2013.01); *H04L 67/18* (2013.01); *H04L 67/303* (2013.01)

(58) Field of Classification Search
CPC ....... H04L 67/18; H04L 67/303; H04W 4/023
See application file for complete search history.

(56) References Cited

U.S. PATENT DOCUMENTS

| 5,896,133 A | 4/1999 | Lynch et al. |
| 6,016,393 A | 1/2000 | White et al. |
| 6,330,586 B1 | 12/2001 | Yates et al. |

(Continued)

OTHER PUBLICATIONS

United States Patent and Trademark Office, "Non-Final Office Action", issued in connection with U.S. Appl. No. 13/149,401, dated Jan. 30, 2014 (8 pages).

(Continued)

*Primary Examiner* — Mohamed A Wasel
(74) *Attorney, Agent, or Firm* — Hanley, Flight and Zimmerman, LLC

(57) ABSTRACT

Example methods disclosed herein to provision a context profile for use in context-based computing include creating, by executing an instruction with a processor, a context profile associated with a first location. The context profile contains context information identifying a computing resource available at the first location. The context information also specifies an associated set of resource interaction characteristics for interacting with the computing resource. Example disclosed methods further include enabling access to the context profile by an electronic device having a device location corresponding to the first location in response to a query containing a request for the context information received from the electronic device.

20 Claims, 9 Drawing Sheets

(56) References Cited

U.S. PATENT DOCUMENTS

| | | | |
|---|---|---|---|
| 7,209,964 B2 | 4/2007 | Dugan et al. | |
| 7,689,998 B1* | 3/2010 | Chrysanthakopoulos | G06F 9/4881 |
| | | | 718/104 |
| 7,716,651 B2 | 5/2010 | Cukierman et al. | |
| 7,930,214 B2* | 4/2011 | Knauerhase | G06Q 10/0631 |
| | | | 455/3.01 |
| 8,019,282 B2* | 9/2011 | Blight | G01S 5/02 |
| | | | 342/450 |
| 8,184,646 B2* | 5/2012 | Chen | H04L 12/6418 |
| | | | 370/401 |
| 8,325,882 B1* | 12/2012 | Klesper | H04M 11/04 |
| | | | 379/33 |
| 8,396,485 B2* | 3/2013 | Grainger | G01S 5/0257 |
| | | | 455/456.1 |
| 8,612,568 B2 | 12/2013 | Tian | |
| 8,612,569 B2* | 12/2013 | Douglas | H04L 67/20 |
| | | | 709/224 |
| 2004/0054923 A1* | 3/2004 | Seago | H04L 63/102 |
| | | | 726/4 |
| 2004/0236633 A1* | 11/2004 | Knauerhase | G06Q 10/0631 |
| | | | 705/26.8 |
| 2004/0255018 A1* | 12/2004 | Taraci | H04L 41/00 |
| | | | 709/223 |
| 2005/0165828 A1 | 7/2005 | Lange et al. | |
| 2005/0289536 A1 | 12/2005 | Nayak et al. | |
| 2006/0022048 A1 | 2/2006 | Johnson | |
| 2007/0150589 A1* | 6/2007 | Kim | G06F 8/60 |
| | | | 709/224 |
| 2007/0168506 A1* | 7/2007 | Douglas | H04L 67/20 |
| | | | 709/224 |
| 2009/0156161 A1* | 6/2009 | Strahs | H04W 4/90 |
| | | | 455/404.2 |
| 2009/0164500 A1 | 6/2009 | Mathur et al. | |
| 2009/0182565 A1 | 7/2009 | Erickson et al. | |
| 2010/0050234 A1* | 2/2010 | Lindholm | H04W 8/04 |
| | | | 726/3 |
| 2010/0205416 A1 | 8/2010 | Lanner et al. | |
| 2011/0082935 A1 | 4/2011 | Zetterman et al. | |
| 2012/0115512 A1* | 5/2012 | Grainger | G01S 5/0257 |
| | | | 455/456.3 |
| 2012/0209872 A1* | 8/2012 | Woods | G06F 17/30867 |
| | | | 707/769 |
| 2012/0302256 A1* | 11/2012 | Pai | H04W 4/02 |
| | | | 455/456.2 |
| 2012/0311130 A1 | 12/2012 | Zadig | |
| 2013/0019089 A1* | 1/2013 | Guidotti | G06F 9/5072 |
| | | | 713/100 |
| 2014/0075025 A1* | 3/2014 | Stanforth | H04W 48/14 |
| | | | 709/225 |

OTHER PUBLICATIONS

United States Patent and Trademark Office, "Restriction Requirement", issued in connection with U.S. Appl. No. 13/149,401, dated Jun. 23, 2014 (6 pages).

United States Patent and Trademark Office, Notice of Allowance, issued in connection with U.S. Appl. No. 13/149,401, dated Nov. 19, 2014 (17 pages).

United States Patent and Trademark Office, Notice of Allowance, issued in connection with U.S. Appl. No. 13/149,401, dated Mar. 2, 2015 (12 pages).

United States Patent and Trademark Office, "Non-Final Office Action", issued in connection with U.S. Appl. No. 14/642,231, dated Apr. 20, 2016 (8 pages).

United States Patent and Trademark Office, "Notice of Allowance", issued in connection with U.S. Appl. No. 14/642,231, dated Oct. 7, 2016 (8 pages).

* cited by examiner

CONTEXT-BASED COMPUTING FRAMEWORK FOR OBTAINING COMPUTING RESOURCE CONTEXT INFORMATION ASSOCIATED WITH A LOCATION

RELATED APPLICATION(S)

This patent arises from a continuation of U.S. patent application Ser. No. 14/642,231 (now U.S. Pat. No. 9,577, 896), which is entitled, "CONTEXT-BASED COMPUTING FRAMEWORK FOR OBTAINING COMPUTING RESOURCE CONTEXT INFORMATION ASSOCIATED WITH A LOCATION," and which was filed on Mar. 9, 2015, which is a divisional of U.S. patent application Ser. No. 13/149,401 (now U.S. Pat. No. 8,996,687), which is entitled "CONTEXT-BASED COMPUTING FRAMEWORK," and which was filed on May 31, 2011. U.S. patent application Ser. No. 13/149,401 and U.S. patent application Ser. No. 14/642,231 are hereby incorporated by reference in their respective entireties.

FIELD OF THE DISCLOSURE

This disclosure relates generally to computing and, more particularly, to a context-based computing framework.

BACKGROUND

People often adapt their behavior to a particular social context. For example, context and context cues are learned over time and can serve as a frame of reference for human interactions when a person arrives in a new, and possibly unfamiliar, setting. In contrast, computing devices are often limited to performing a set of predefined tasks regardless of the context of the environment in which they are operating. Furthermore, because existing computing devices are typically unaware of the context of their operating environments, reconfiguring such a computing device after being placed in or moved to a different environment having a different context may involve significant manual intervention.

DETAILED DESCRIPTION

Figure 1:
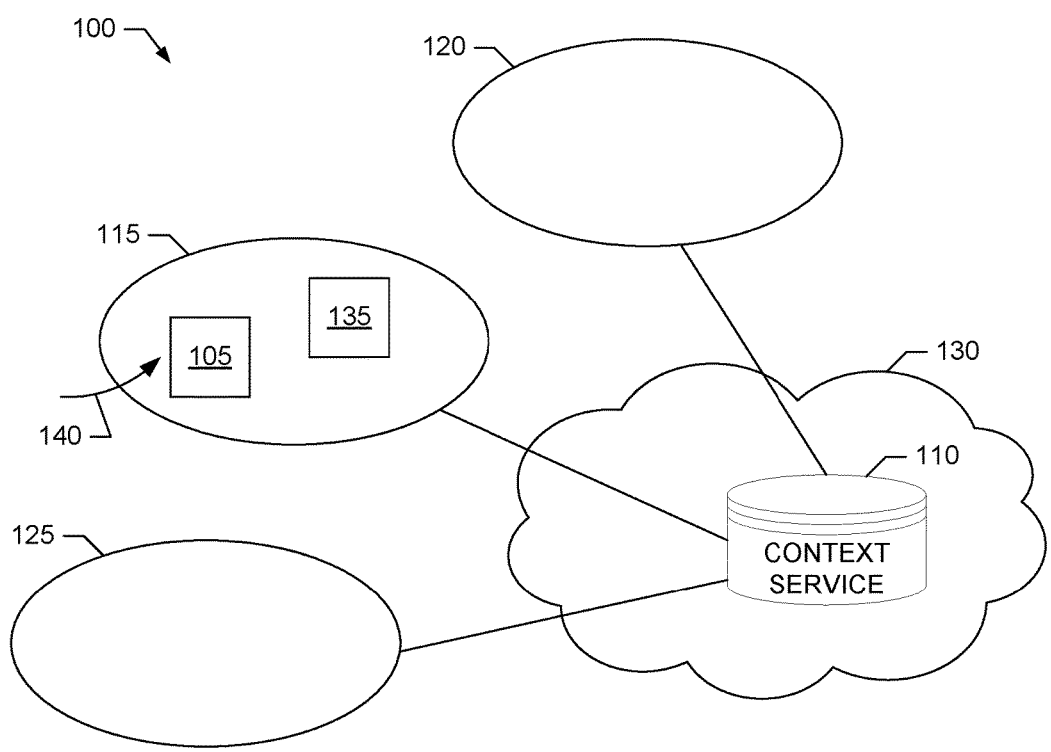
FIG. 1 is block diagram of an example system implementing context-based computing in accordance with an example context-based computing framework disclosed herein.

An example context-based computing framework that can be utilized by example disclosed methods, apparatus and articles of manufacture to provide context-based computing is disclosed herein. An example disclosed method to provide context-based computing includes a computing device receiving context information provisioned for a current location from a context service in response to a query. The example method also includes the computing device configuring interaction with a resource associated with the current location based on the context information received from the context service. For example, the context information can identify a set of resources available at the current location, and also specify an associated set of resource interaction characteristics for interacting with the set of resources. In some examples, receiving the context information involves receiving a context grant message including the context information when authorization based on identify information and/or application descriptive information included in the query is successful. In some examples, the context information returned by the context service is determined from one or more context profiles provisioned for the current location. For example, the context service can use information included in the query to determine a role classification specifying the extent with which the query source can interact with the resource, and then obtain from the context profile(s) the context information that is relevant to this role classification. In some examples, configuring interaction with the resource involves using the configuration information returned by the context service to configure an application to recognize the resource, and communicating with the context service to establish interaction with the resource.

Another example disclosed method to provide context-based computing includes a context service determining a location associated with a query received from a computing device requesting context information. The example method also includes the context service obtaining the context information from a context profile provisioned for the location. The example method further includes sending the context information to the computing device in response to the query to enable the device to configure interaction with a resource associated with the location based on the context information. As mentioned above, the context information can, for example, identify a set of resources available at the location, and also specify an associated set of resource interaction characteristics for interacting with the set of resources. In some examples, the method additionally includes obtaining multiple context profiles provisioned for the location and selecting a particular context profile from the plurality of context profiles based on selection criteria, such as selection based on a current time and/or information included in the query. In some examples, the method additionally or alternatively involves processing information included in the query to determine whether the query is authorized, and sending the context information to the device if the query is determined to be authorized, but not sending the context information to the device if the query is determined to not be authorized. In some examples, the method additionally or alternatively includes processing information included in the query to determine a role associated with the device for interacting with the resource, and then obtaining from the context profile the context information that is relevant to that role.

The foregoing example methods illustrate that the context-based computing framework disclosed herein enables the behavior of computing devices to adapt according to the context of their current operating environment. As noted above, from the perspective of human social interactions, human behavior often changes to adapt to a particular social context. Context and context cues are learned over time and serve as a frame of reference for social and physical interactions in a particular setting. From a human perspective, the context of a setting can be defined in terms of, for example, a location of the setting, objects within the setting, other people located in the setting, a time of day, roles played by people within the setting, actions performed by the participants, etc.

Human social interactions based on social context can be illustrated using the following example. During a guest's visit to a host's home, the guest is unlikely to ask the host, "Do you have a bathroom?" Instead, a more likely question is, "Where is your bathroom?" The reason the latter question is more likely is that individuals, through experience, learn that modern homes generally contain a bathroom. Thus, when a person is in the context of a home, the person knows that the home contains a bathroom. The question for the person then becomes where the bathroom is located, not whether the bathroom exists. In contrast, a visitor to a place of business may indeed ask, "Do you have a bathroom?" Unlike the home context, in the business context the existence of a bathroom is less certain and, thus, asking whether a bathroom exists may be appropriate. As can be seen from this example, a person's behavior changes as her context changes. Moreover, such an understanding of context can increase the overall efficiency of activity in a given context.

Unlike human beings that adapt to their current social context, existing computing devices are typically unaware of and, thus, do not adapt to the context of the environment in which they are currently operating. As such, reconfiguring such an existing device for use in a different environment having a different context may involve significant manual intervention and/or programmatic activity. For example, from a software development perspective, such reconfiguration may involve replication of code and processing across numerous applications, which can increase overall development costs and extend time to market. In contrast, the context-based computing framework disclosed herein treats computing devices as computing entities whose behavior can adapt to a particular operating environment context, much like social entities (e.g., human beings) whose social behavior adjusts to their current social context. By enabling computing devices to automatically adapt to their current context, the use of computing devices and services supporting the entity computing framework can be more intuitive and seamless than for existing computing devices, especially as a user moves among environments having different contexts.

Turning to the figures, a block diagram of an example system 100 implementing context-based computing in accordance with an example disclosed context-based computing framework is illustrated in FIG. 1. In the system 100 of the illustrated example, example computing devices 105 and 135 learn their context through an example context service 110 offered by, for example, a service provider. The context learned by a computing device, such as the computing device 105, includes electronic and/or other types of device accessible information associated with a particular environment (e.g., which may be a subscriber domain, as described below), such as, but not limited to, an electronic inventory of devices, services, etc., available in that environment. In some examples, the context for a particular environment (e.g., subscriber domain) is logically divided into two categories, namely, a base context category and a transient context category.

Base context, which is also referred to as semi-fixed context, reference context, etc., represents stable information associated with a particular environment. For example: while a bathroom in a home can be remodeled, the bathroom occupies a relatively stable position with in a home. Similarly, in the electronic context of a home, devices such as stereos, televisions, appliances, etc., have relatively stable positions in the environment and, as such, define the base context for that environment. In the case of mobile devices, which can move from place to place, the device's home context is associated with the base context of the environment in which the device primarily resides (e.g., such as the subscriber domain associated with the residence of the owner of the mobile device). Following the human social model, people are strongly associated with their residences, and an individual's residence can serve as an identifier even when the individual is a great distance away. The home context of a device serves a similar purpose and can enable the projection and/or sharing of resident services across subscriber domains.

Transient context represents information about an environment that is time dependent, such as information concerning devices, services, etc., that are present for a limited period of time in the environment and are no longer present in the environment after that time. For example, consider a scenario in which a household has a child's birthday party with temporary sources of entertainment, such as a jukebox, a karaoke machine, etc. The transient context in this case includes the guests (and their respective personal electronic devices) and the temporary entertainment devices. The devices, services, etc., specific to the objective of the party are associated with a transient context, which will be valid for a fixed period time, and then the environment returns to its base context. However, an environment's transient context can have lasting effect on its base context, for example, by augmenting or reducing the base context. For example, is the child receives a video game at the party as a birthday gift, the video game becomes part to the ongoing base context of the environment. The disclosed framework enables such changes to the base context to be captured and used to update the base context.

Thus, context sessions with a particular computing device, such as the computing device 105, can be dynamic and based on both base context information and transient context information provided the context service 110 and tailored to a particular environment (e.g., subscriber domain), to the capabilities of the particular device 105, and/or to the particular user of the particular device 105, etc. Context sessions can also be adaptive. For example, similar to how a party or a game changes as the number of participants change, context sessions with a particular computing device can change over the period of the session. As such, the context service 110 can redistribute roles and responsibilities among the devices participating in a particular context session.

With the foregoing in mind, the context service 110 can provide context information (e.g., obtained from context profiles) for example subscriber domains 115-125, which can also be referred to as electronic places 115-125. Although FIG. 1 depicts the example system 100 as including two computing devices 105 and 135, one context service 110 and three subscriber domains 115-125, the system 100 and, more generally, the examples disclosed herein can support any number of computing device(s) 105/135, context service(s) 110 and subscriber domain(s) 115-125. Also, and as described in greater detail below, different context information (e.g., in the form of different context profiles) can be specified and provided for each of the different subscriber domain 115-125. Furthermore, in some examples, a particular subscriber domain, such as the subscriber domain 115, can have multiple, different sets of context information (e.g., in the form of different context profiles), with a particular set of context information being selected on a particular occasion based on one or more selection criteria.

For example, in the system 100 of FIG. 1, the subscriber domain 115 has a base context that includes the computing device 135. When the computing device 105 enters the subscriber domain 115 (represented by a directed line 140), the subscriber domain 115 has a transient context that now includes the incremental context attributes of the computing device 105. When the computing device 105 exits the subscriber domain 115, the context of the subscriber domain 115 returns to its base context. However, if the computing device 105 is to be associated with the subscriber domain 115 with at least some permanence, such as in the case of a mobile phone purchased by a member of a household corresponding to the subscriber domain 115, the device 105 may become part of the base context of the subscriber domain 115. Furthermore, in such an example, the base context of the subscriber domain 115 can become the home context of the computing device 105.

The context information for a particular subscriber domain, such as the subscriber domain 115, can be specified by, for example, a service provider and/or an authorized subscriber/user associated with the subscriber domain 115. As described in greater detail below, the example disclosed framework also allows or the updating of the external context servers with the local context changes, thereby maintaining a consistent model and history of activity. Referring to the subscriber domain 115 for ease of discussion and without loss of generality, the context information for the subscriber domain 115 is generally associated with a particular location (e.g., the location of the subscriber domain 115) and defines what a computing device, such as the computing device 105, can do at that particular location.

For example, the context information for the subscriber domain 115 can specify resources, such as one or more device(s), service(s), etc., that can be accessed at the subscriber domain 115. In some examples, the context information for the subscriber domain 115 can also specify role classifications for different categories of computing devices and/or for different applications that can be executed on the computing devices. For example, a role classification can specify a role that a particular computing device, such as the computing device 105, can have when interacting with a particular resource (e.g., a particular device and/or service) at the subscriber domain 115. Additionally or alternatively, in some examples the context information provided by the context service 110 for the subscriber domain 115 can depend on specified personalization information (e.g., such as user permissions, user preferences, etc.). Context information can also be time dependent.

In some examples, the context service 110 resides in an example computing cloud 130 and is queried by the computing device 105 to obtain context information when the computing device 105 (or a context client executing on the computing device 105) detects a change in location (e.g., such as when the computing device moves from one subscriber domain 115-125 to another subscriber domain 115-125). For example, the computing device 105 can detect a location change associated with moving from the subscriber domain 120 to the subscriber domain 115 by detecting a change in the global positioning system (GPS) location of the computing device 105. Additionally or alternatively, the computing device 105 can detect a location change by detecting that it has changed the routing gateway with which it is registered to obtain network access (e.g., assuming that the different subscriber domains 115-120 employ different routing gateways to obtain network access). In some examples, responsibility for providing context services for a particular subscriber domain can be delegated to the subscriber domain (e.g., to one or more devices in the domain) provided that context changes in the domain are promulgated back to a context authority, such as the context service 110.

In the illustrated example, the computing devices 105 and 135 can correspond to any type of computing device, such as, but not limited to, a mobile phone/smartphone, a personal digital assistant (PDA), a tablet computer, a set-top box, a personal computer, a server, etc. In some examples, the computing devices 105 and/or 135 includes device descriptive information, such as device capacity/capabilities, identity information, application descriptive information (e.g., in the form of one or more application signatures for a respective one or more applications currently being executed on the device), etc., in the context query sent to the context service 110. In some examples, the disclosed framework can use this device descriptive information to group devices into groups of electronic entities having different levels of computing power. Many electronic devices have some amount/form of processing capability. The disclosed framework assigns different levels of capabilities and associates these different capability levels with roles that can be performed by devices in a given environment. For example, devices having substantial processing capability, such as desktop computers, Apple iPads® and iPhones®, Google Android™-based mobile devices, etc., may be assigned tasks or allowed to bid on tasks within a subscriber domain, thereby moving computing activity to a local environment to offload this activity from the computing cloud 130.

In response to the context query, the context service 110 resolves (e.g., determines) a location of the context query and, thus, the location of the computing device 105. The context service 110 then identifies the subscriber domain corresponding to the location of the computing device 105. In some examples, the context service 110 determines the location of the context query and, thus, the computing device 105 based on GPS information included in the context query. In some examples, the context service 110 additionally or alternatively determines the location of the context query and, thus, the computing device 105 based on an originating Internet protocol (IP) address determined for the computing device. For example, when the computing device 105 obtains network access via a routing gateway associated with a particular subscriber domain, the originating IP address assigned to the computing device 105 by the routing gateway can indicate that the computing device is located at that particular subscriber domain. In some examples, the context service 110 additionally or alternatively determines the location of the context query and, thus, the computing device 105 based on other information identifying the computing device 105 (e.g., such as a globally unique identifier (GUID) or other device identifier, etc.) and/or other information reference another address associated with the computing device 105 (e.g., such as an originating gateway IP address, a medium access control (MAC) address, etc.).

Assume for ease of discussion, and without loss of generality, that the context service 110 identifies that subscriber domain 115 corresponds to the location of the context query and, thus, the location of the computing device 105. The context service 110 then retrieves one or more context profiles associated with the subscriber domain 115. In some examples, the context service 110 examines the information provided by the computing device 105 in the context query to determine what context information to return in a response. For example, the context service 110 can authenticate the computing device 105 (or a user of the computing device 105) using identification and/or application descriptive information included in the query. Additionally or alternatively, the context service 110 can determine a role classification for the computing device 105 using, for example, device descriptive information and/or application descriptive information provided in the context query.

In some examples, if authentication is performed and is successful, the context service 110 replies to the query with a context grant indicating that the computing device 105 has been granted access to the context service. Additionally, the context service 110 returns context information (e.g., such as key(s), token(s), configuration information, etc.) for the subscriber domain 115 that is relevant to the role classification determined for the computing device 105. For example, the context information can identify the resources (e.g., device(s), service(s), etc.) associated with the subscriber domain 115 with which the computing device 105 may interact (e.g., also referred to herein as the identified resources) and to what extent the computing device 105 may interact with the identified resource(s) (e.g., also referred to herein as the resource interaction characteristics). In some examples, the identified resource(s) and resource interaction characteristics specified in the context information returned by the context service 110 for the subscriber domain 115 may differ for different computing devices in accordance with the different role classifications of the device. For example, the context service 110 can evaluate the device descriptive information and/or application descriptive information included in a context query to determine the capabilities and capacity of a computing device sending the context query. The context service 110 can also associate certain identified resources and certain associated resource interaction characteristics with specified ranges of device capabilities and/or capacities. In such examples, the different specified ranges of device capabilities and/or capacities are associated with different role classifications, with each role classification being associated with a respective set of identified resources and corresponding resource interaction characteristics that are to be included in the context information provided to computing devices falling into the respective role classification. For example, more powerful devices could be associated with roles having more identified resources and more extensive resource interaction characteristics than for less powerful devices. Additionally, in some examples, more powerful devices residing within the subscriber domain 115 may assume the processing responsibility for one or more services to be provided at the domain 115 and, thus, host those services for use by other devices (e.g., the device 135) in the domain 115. In some examples, if no device of sufficient capability is available to assume the processing responsibility for these services, such service can be identified as external services and provided by external resources, such as the computing cloud 130, during the current context session.

In some examples, the computing device 105 uses the returned context information to configure the functionality of the computing device (and/or one or more applications executing on the computing device) to adapt to the current context of the subscriber domain 115. For example, the computing device 105 can use the context information to configure an interface for interacting with one or more of the identified resources associated with the subscriber domain 115 in accordance with the resource interaction characteristics specified for the identified resource(s). The computing device then further interacts with the context service 110, as appropriate, to configure and enable access to and interaction with the resource(s) available at subscriber domain 115.

As an illustrative example, consider a scenario in which the subscriber domains 115-125 are associated with university classrooms. Each classroom can have different, time-dependent contexts associated with the different classes taught in each classroom at different times throughout the day. Each classroom context also has a distinct set of roles associated with it. For example, an instructor leads the classroom, whereas students follow the instructor's lecture and lesson plan. Current trends in education are leveraging use of tablet devices, such as the Apple iPad®, in the classroom. Using a context-based computing framework such as that illustrated in FIG. 1, when a student's computing device 105 (e.g., such as an iPad) enters the classroom associated with subscriber domain 115, the computing device 105 can query the context service 110 to determine the current context of the classroom. In response, the computing device 105 receives context information consistent with the context service 110 classifying the role of the computing device 105 as being a student device. For example, the role classification can be determined based on application descriptive information included in the query indicating that a student application is executing on the computing device 105, and/or identification information included in the query identifying the particular student identifying the device.

After receiving the context information, the computing device 105 can use the context information to automatically configure one or more applications executing on the computing device 105 to, for example, interact with the teacher's computing device (not shown) and/or another resource specified in the context information to obtain notes, class assignments, presentations and reading materials as specified by the teacher for the particular subject. In such an example, the context service 110 would include the teacher's computing device in the identified resources provided in the context information, with the level of interaction with the teacher's computing device being restricted based on the associated resource interaction characteristics provided in the context information. Later, when the student moves to her next class associated with a different subscriber domain (e.g., such as the subscriber domain 120), the classroom context changes and new roles are established. In such an example, the student's computing device 105 could detect the change in location and query the context service 110 to obtain context information for the new subscriber domain. The student's computing device 105 uses the obtained context information to adapt to the new classroom environment, as described above. For example, the notes, class assignments, presentations and reading materials presented by the student's computing device 105 could adapt to be relevant to the new classroom venue (e.g., by being obtained from a different resource associated with the new subscriber domain).

A further extension of the above example leverages the fact that each student in a class may have her enrollment in the class as part of her personal context. Because students can share their personal contexts, a social networking service opportunity exists for the formation of study groups gated by roles and class enrollment, and/or other identifying factors. When a study group is formed (e.g., an agreed upon meeting time is reached) that group formation and activity becomes its own discreet context.

Figure 2:
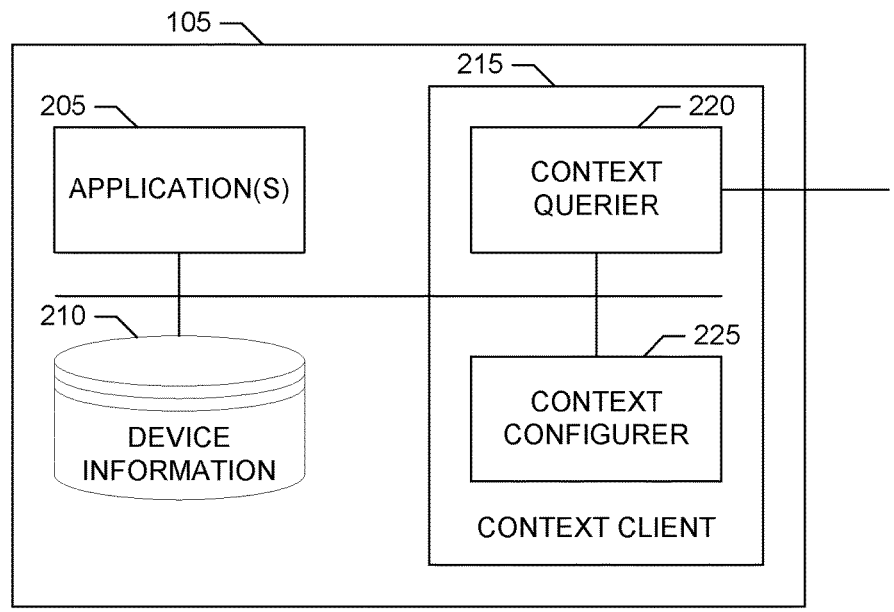
FIG. 2 is a block diagram of an example computing device including an example context client that may be used to support context-based computing in the example systems of FIGS. 1, 4 and/or 6.

A block diagram of an example implementation of the computing device 105 of FIG. 1 is illustrated in FIG. 2. The example computing device 105 of FIG. 2 includes an example application set 205 containing one or more applications capable of being executed or otherwise provided by the computing device 105. The application(s) included in the application set 205 are to interact with one or more types of resources (e.g., device(s), service(s), etc.) associated with the subscriber domain in which the computing device 105 is located. For example, one application in the application set, such as an application capable of presenting multimedia content, may be able to interact with a variety of different types of resources, provided the resources support one or more standardized messaging/content formats. Conversely, another application, such as a remote control application, may be restricted to interacting with a particular (or limited set) of resources supporting a specified (e.g., proprietary) messaging/content interface.

The example computing device 105 of FIG. 2 also includes an example storage 210 to store device information. For example, the storage 210 can store device descriptive information that describes the capacity (e.g., such as memory capacity, processing capacity, etc.) and/or capabilities (e.g., user interface capabilities, communication capabilities, etc.) of the computing device 105. Additionally or alternatively, the storage 210 can store application descriptive information that describes the application(s) includes in the application set 205. In some examples, the application descriptive information includes one or more application signatures that identify the application(s) included in the application set 205. For example, an application signature for a particular application can be a unique binary or alphanumeric string specified for the application or derived by processing a digital representation of the application as stored in memory. Additionally or alternatively, the storage 210 can store any type of identify information identifying the computing device 105 and/or one or more users of the computing device 105. Furthermore, the storage 210 stores context information received from, for example, the context service 110 in response to one or more context queries.

To support context-based computing, the example computing device 105 of FIG. 2 includes an example context client 215. In the illustrated example, the context client 215 further includes an example context querier 220 and an example context configurer 225. The context querier 220 is to send queries to a context service (e.g., such as the context service 110) to obtain context information for the subscriber domain associated with a current location of the computing device 105. Additionally, in response to the query, the context querier 220 is to receive from the context service the context information provisioned the subscriber domain associated with the current location of the computing device 105.

In some examples, the context querier 220 sends a context query to a context service in response to detecting a change in the location of the computing device 105. For example, if the computing device 105 includes GPS location capabilities, the context querier 220 can detect such a location change by detecting a change in GPS data that indicates movement of the computing device has exceeded a threshold distance. Additionally or alternative, the context querier 220 can detect a location change by detecting that the computing device 105 as changed the routing gateway with which it is registered to gain network access. In some examples, the context querier 220 includes query information, such as the device descriptive information, the application descriptive information and/or the identity information described above, in the context query sent to the context service to enable the context service to authenticate the query and return context information that is relevant to the computing device 105. For example, context information that is relevant to the computing device 105 may be a portion of the context profile provisioned for the current subscriber domain that specifies those resources and associated resource interaction characteristics with which the computing device 105 is actually capable of supporting interaction (e.g., based on the device's capacity, capabilities and/or available applications).

The context configurer 225 included in the context client 215 of the illustrated example is to configure interaction with one or more resources identified in the context information received from the context service for the subscriber domain associated with the device's current location. For examples, the context configurer 225 can translate the received context information into one or more format(s), parameter(s), data structure(s), etc., for configuring one or more respective application(s) included in the application set 205, and/or for configuring the device 105 itself, to be able to interact with the resource(s) identified in the received context information. As described above, the context information received from the context service identifies a set of resources available at the current location, and can also specify an associated set of resource interaction characteristics for interacting with this set of resources. The context configurer 225 uses this context information, for example, to configure application(s) in the application set 205, and/or the device 105 itself, to recognize one or more of the resources (e.g., device(s), service(s), etc.) identified in the context information. Furthermore, the context configurer 225 can configure/adapt one or more of the applications in the application set 205, and/or the device 105 itself, to provide interface(s) for interacting with the resource(s) at level(s) consistent with the resource interaction characteristics specified in the received context information. In some examples, the context configurer 225 can communicate with the context service to establish interaction with one or more of the resources (e.g., such as when a resource is to be commanded/configured by the context service 110 to recognize the computing device 105 before interaction is possible).

In some examples, the context information provided by the context service 110 may specify a set of different roles (also referred to as role classifications) for interacting with a particular resource. Each role can correspond to a respective level of interaction with the resource (e.g., which may be specified as one or more resource interaction characteristics) and may be defined in terms of a set of device capacity, characteristic(s) and/or available application(s) required to be classified into the respective role. For example, more powerful devices capable of executing certain applications may be classified into roles supporting more resource interaction than less powerful devices that do not have the requisite application(s). In such an example, the context configurer 225 may evaluate the roles specified in the received context information against the device information stored in the storage 210 to determine the appropriate role(s) for interacting with the identified resource(s) and then configure/adapt the computing device 105 accordingly.

Figure 3:
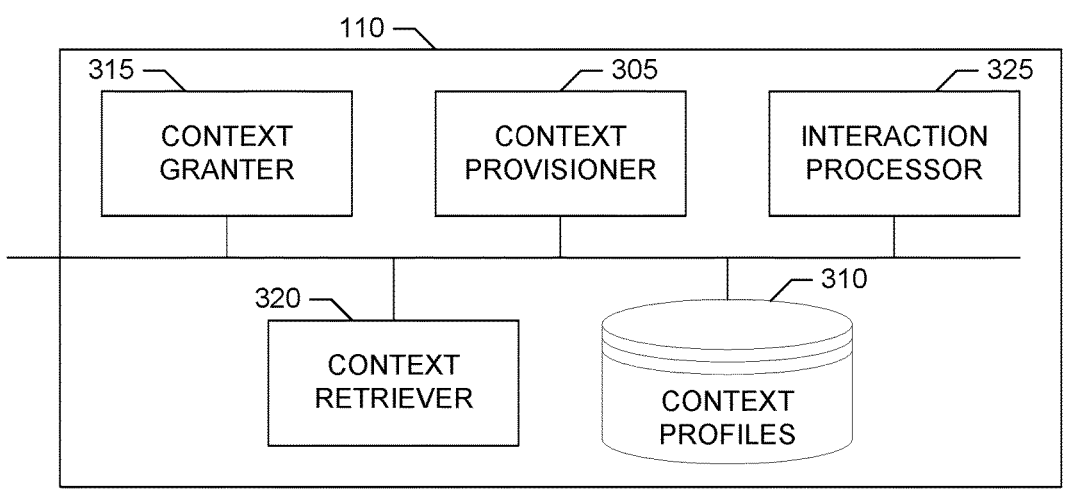
FIG. 3 is a block diagram of an example context service that may be used to support context-based computing in the example systems of FIGS. 1, 4 and/or 6.

A block diagram of an example implementation of the context service 110 of FIG. 1 is illustrated in FIG. 3. The example computing service 110 of FIG. 3 includes an example context provisioner 305 to provision one or more context profiles for each subscriber domain (e.g., each of the subscriber domains 115-125) supporting context-based computing. For example, a context profile for a particular subscriber domain can specify a set of resources accessible at the subscriber domain. Additionally, the context profile can specify resource interaction characteristics for the resource(s) included in the specified set of resources. In some examples, the context profile(s) provisioned by the context provisioner 305 can incorporate user preferences, device characteristics (e.g., capacity and/or capabilities), application characteristics (e.g., types and/or features), etc., to be used to specify different computing device roles, where each role permits interaction with a respective group of resources at the subscriber domain and/or supports a respective set of resource interaction characteristics with a particular resource. In some examples, the context provisioner 305 supports a user interface via which a user can specify and provision context information for storage in one or more context profiles for a particular subscriber domain. In some examples, the context provisioner 305 additionally or alternatively includes one or more communication interfaces to enable context information and/or profiles to be received in digital format via one or more communication networks.

The example context service 110 of FIG. 3 also includes an example storage 310 to store the context profile(s) provisioned by the context provisioner 305. The storage 310 can represent and store the context profile(s) using any number and/or types of data formats, data structures, databases, etc.

The example context service 110 of FIG. 3 further includes an example context granter 315 to receive and respond to context queries from computing devices (e.g., such as the computing device 105) requesting context information. In some examples, the context granter 315 performs authentication of a received query to determine whether the computing device that sent the query is authorized to receive context information for the subscriber domain in which the computing device is located. For example, authentication may be based on identify information included in the context information such that only those users and/or devices specified in the context profile(s) for a particular subscriber domain are authorized to receive context information for that domain. Additionally or alternatively, authentication may be based on application descriptive information (e.g., application signatures) included in the context query, such that only those devices determined to be capable of executing the application(s) specified in the context profile(s) for a particular subscriber domain are authorized to receive the context information for that domain. If authentication based on, for example, the identity and/or application descriptive information is successful, the context granter 315 returns a context grant or similar message to the computing device, along with the context information for the subscriber domain at which the computing device is location. However, if authentication is unsuccessful, the context granter 315 returns no context information to the computing device that sent the context query, although in some examples the context granter 315 may return a context denial or similar message.

To determine the context information to be returned by the context granter 315 in response to a context query, the example context service 110 of FIG. 3 includes an example context retriever 320. In some examples, the context retriever 320 initially determines a location associated with the context query (and, by extension, a location of the computing device that sent the query) to determine the appropriate context information to be returned in response to a query. The context retriever 320 uses this determined location to identify the subscriber domain at which the computing device requesting context information is located. Next, the context retriever 320 retrieves from the storage 310 one or more context profiles provisioned for the subscriber domain at the determined location. Then, the context retriever 320 obtains the context information from one of the retrieved profile(s) and provides the context information to the context granter 315 to be returned to the computing device that sent the context query.

In some examples, multiple context profiles may be provisioned for the same subscriber domain. For example, different context profiles may be specified for use at different times during the day, on different days during the year (e.g., seasonally), etc. Additionally or alternatively, different context profiles may be specified for use with different applications, with different device types and/or devices with different characteristics, with different users, etc. In such examples, the context retriever 320 retrieves the context profiles for the subscriber domain at which the computing device that sent the query is located, and then selects one of the retrieved context profiles using one or more selection criteria. For example, the context retriever 320 can use one or more of a current time, application descriptive information included in the query, device descriptive information included in the query, identification information included in the query, etc., as selection criteria for selecting an appropriate context profile for the subscriber domain at which the computing device that sent the query is located.

As noted above, the context profile(s) provisioned by the context provisioner 305 can incorporate user preferences, device characteristics (e.g., capacity and/or capabilities), application characteristics (e.g., types and/or features), etc., to be used to specify different computing device roles for interacting with resources associated with a particular subscriber domain. Accordingly, in some examples, the context retriever 320 uses one or more of the device descriptive information, application descriptive information, identity information, etc., included in the context query to determine a role (or role classification) for the computing device in that subscriber domain. The context retriever 320 then uses the determined role for the computing device to obtain (e.g., extract, formulate, etc.) the context information relevant to that role (and, thus, relevant to the computing device) from the context profile retrieved/selected for that particular subscriber domain.

In some examples, the context service 110 of FIG. 3 also includes an example interaction processor 325. After the context granter 315 sends the context information to the computing device (e.g., the computing device 105) that sent the associated context query, the interaction processor 325 is to receive request(s) from the computing device to interact with one or more of the resource(s) specified in the context information. The interaction processor 325 may then communicate and send command(s) to the resource(s) to establish interaction between the computing device and the resource(s). An example operation of the interaction processor 325 is described in greater detail below.

While example manners of implementing the computing device 105 and the context service 110 of FIG. 1 have been illustrated in FIGS. 2 and 3, respectively, one or more of the elements, processes and/or devices illustrated in FIGS. 2 and/or 3 may be combined, divided, re-arranged, omitted, eliminated and/or implemented in any other way. Further, the example application set 205, the example storage 210, the example context client 215, the example context querier 220, the example context configurer 225, the example context provisioner 305, the example storage 310, the example context granter 315, the example context retriever 320, the example interaction processor 325 and/or, more generally, the example computing device 105 and/or the example context service 110 of FIGS. 2-3 may be implemented by hardware, software, firmware and/or any combination of hardware, software and/or firmware. Thus, for example, any of the example application set 205, the example storage 210, the example context client 215, the example context querier 220, the example context configurer 225, the example context provisioner 305, the example storage 310, the example context granter 315, the example context retriever 320, the example interaction processor 325 and/or, more generally, the example computing device 105 and/or the example context service 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example computing device 105, the example context service 110, the example application set 205, the example storage 210, the example context client 215, the example context querier 220, the example context configurer 225, the example context provisioner 305, the example storage 310, the example context granter 315, the example context retriever 320 and/or the example interaction processor 325 are hereby expressly defined to include a tangible computer readable medium such as a memory, digital versatile disk (DVD), compact disk (CD), etc., storing such software and/or firmware. Further still, the example computing device 105 and/or the example context service 110 of FIGS. 2-3 may include one or more elements, processes and/or devices in addition to, or instead of, those illustrated in FIG. 2-3, and/or may include more than one of any or all of the illustrated elements, processes and devices.

Figure 4:
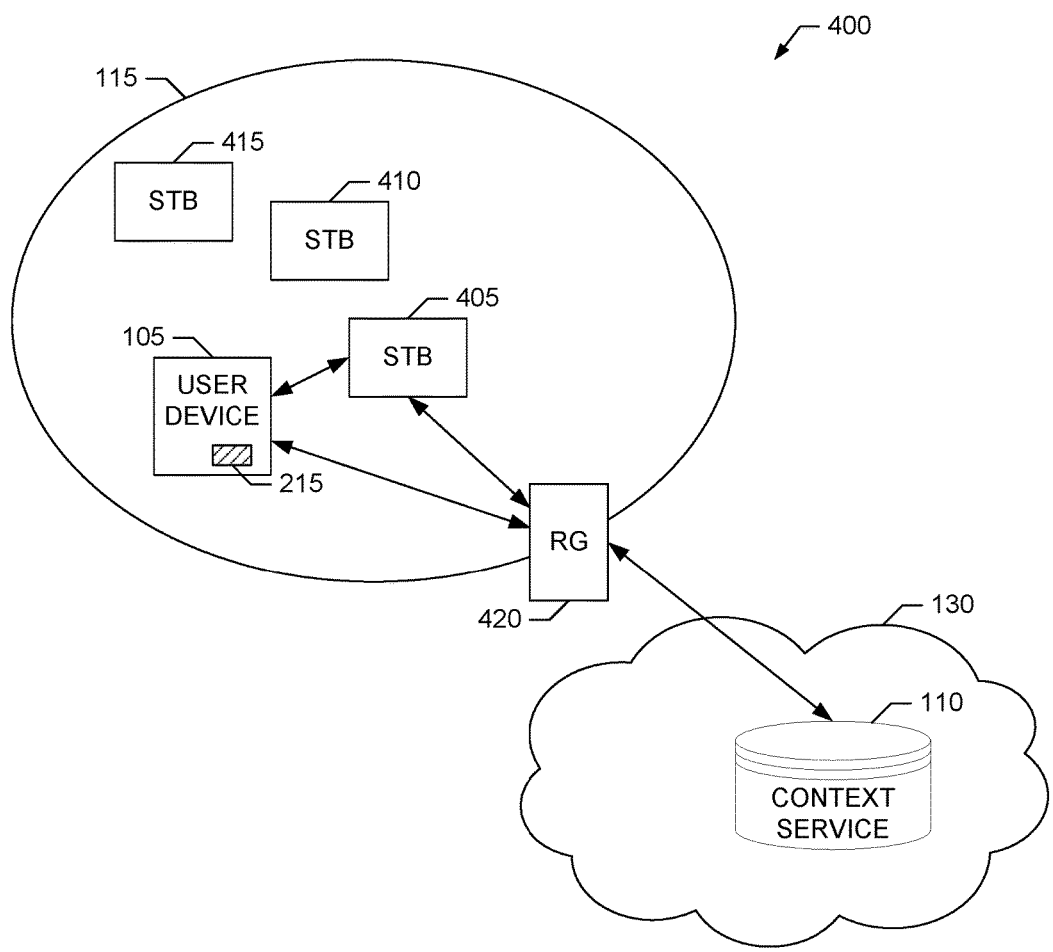
FIG. 4 is a block diagram of a portion of the system of FIG. 1 that further depicts a first example subscriber location employing context-based computing in accordance with the example context-based computing framework disclosed herein.

An example system 400 illustrating a portion of the example system 100 of FIG. 1 that contains the computing device 105, the context service 110, the subscriber domain 115 and the cloud 130 is illustrated in FIG. 4. The example system 400 also illustrates an example implementation of the subscriber domain 115 of FIG. 1. In the illustrated example of FIG. 4, the subscriber domain 115 includes multiple set top boxes (STBs) 405-415 to provide cable, satellite and/or Internet television service to multiple television sets (not shown). The subscriber domain 115 of the illustrated example also includes a routing gateway (RG) 420 to provide devices in the subscriber domain, including the STBs 405-415 and the computing device 105, with access to a communication network, such as the Internet. In some examples, the RG 420 provides the context service 110 with an originating point or identifier that enables the context service 110 to setup and retrieve the context associated with the subscriber domain 115 and return the associated context information to the context-aware devices (e.g., such as the computing device 105) in the domain 115.

Figure 5:
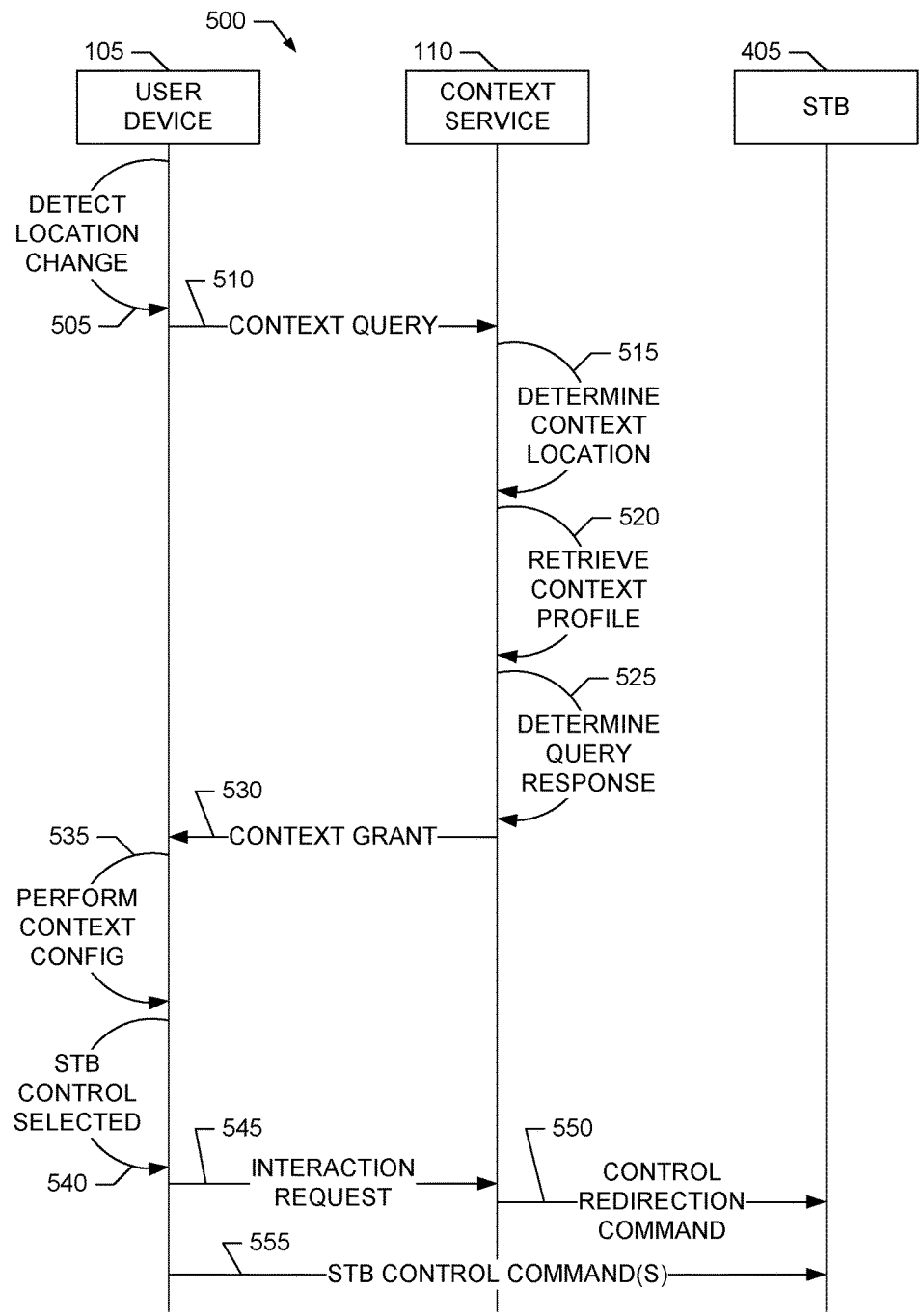
FIG. 5 is a message sequence diagram illustrating example messages that can be exchanged among an example computing device, an example context service and an example resource to implement an example of context-based computing in the system of FIG. 4.

The computing device 105 includes the context client 215 described above and, thus, is a context-aware computing device. An example of context-based computing that can be performed in the example system 400 of FIG. 4 is described in connection with an example message sequence diagram 500 illustrated in FIG. 5. Referring to FIGS. 4 and 5, when the context-aware computing device 105 (e.g., which may be a smartphone) enters the subscriber domain 115, the computing device 105 detects a location change when it registers with the RG 420 for network access (represented by directed line 505 in FIG. 5). In response to detecting the location change, the computing device 105 sends a context query 510 to the context service 110 to obtain context information for its current location. The context service 110 determines that the computing device 105 is located in the subscriber domain 115 using the originating IP address of the context query 505 (represented by directed line 515 in FIG. 5), because the originating IP address was assigned to the computing device 105 by the RG 420 of the subscriber domain 115. The context service 110 then retrieves/selects a context profile provisioned for the subscriber domain 115 (represented by directed line 520 in FIG. 5). For example, the context profile provisioned for the subscriber domain 115 may specify the availability of one or more of the STBs 405-415, the categories of computing devices capable of controlling the STBs 405-415, personalization information specifying the particular individuals and/or computing devices permitted to control the STBs 405-415, etc., or any combination thereof.

Next, the context service 110 uses the information provided in the context query 510 to determine from the context profile whether the computing device 105 is authorized to control one or more of the STBs 405-415 at the subscriber domain 115. Assuming this authentication is successful, the context service 110 then determines the appropriate context information to include in the query response (represented by directed line 525 in FIG. 5.) For example, the context service 110 can use the information included in the context query 510 to determine a role classification for the computing device 105, and then use the role classification to obtain the relevant context information from the context profile for the subscriber location 115, as described above. After determining the context information to include in the query response, the context service 110 returns a context grant 530 to the computing device 105, along with relevant context information for the subscriber location 115. In the illustrated example, the context information specifies that the STBs 405-415 are available, and also specifies resource interaction characteristics defining to what extent the computing device 105 can control a particular STB 405-415. For example, a simple computing device 105 with limited functionality may be limited to invoking basic functionality of a particular STB 405-415, whereas a more complex computing device 105 could invoke more complex functionality of the particular STB 405-415. Additionally or alternatively, a user's identity could also impact the role classification of the computing device 105.

In response to receiving the context grant 530 and associated context information from the context service 110, the computing device 105 adapts its configuration in accordance with the received context information (represented as directed line 535 in FIG. 5). For example, the computing device 105 could use the context information to configure one or more applications, such as a remote control application, executing on the computing device 105 to recognize the STBs 405-415 identified in the context information. Additionally, the computing device 105 could configure these application(s) to provide user interfaces consistent with the resource interaction characteristics specified in the received context information. In the illustrated example, at a later time the computing device 105 selects (e.g., based on a user input) to control, for example, the STB 405 that was identified in the context information (represented as directed line 540 in FIG. 5). In response, the computing device 105 sends an interaction request 545 to the context service 110 to indicate that it is requesting to directly control the STB 405. In response, the context service 110 issues instruction(s) 550 to the STB 405 (e.g., via a communication network) to redirect control of the STB 405 to the consumer device 110. The consumer device is then able send control command(s) 555 to the STB 405 to directly control the STB 405. As can be seen from this example, the context-aware computing device 105, which is operating in accordance with the entity computing framework described herein, is able to adapt its operation based on the context learned from the context service 110 for the device's current location (e.g., the subscriber domain 115).

Figure 6:
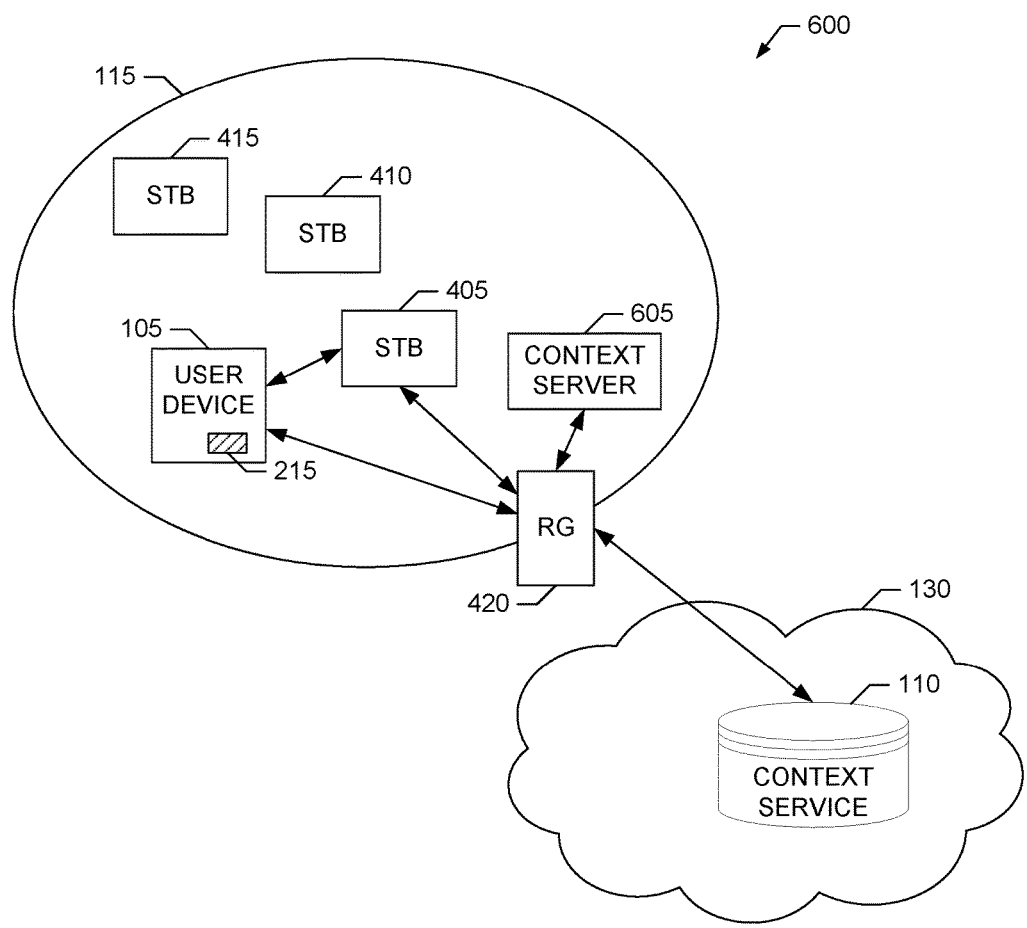
FIG. 6 is a block diagram of a portion of the system of FIG. 1 that further depicts a second example subscriber location employing context-based computing in accordance with the example context-based computing framework disclosed herein.

Another example system 600 illustrating a portion of the example system 100 of FIG. 1 that contains the computing device 105, the context service 110, the subscriber domain 115 and the cloud 130 is illustrated in FIG. 6. The example system 600 illustrates another example implementation of the subscriber domain 115 of FIG. 1. Similar to the example of FIG. 4, the example subscriber domain 115 illustrated in FIG. 6 includes the STBs 405-415 to provide cable, satellite and/or Internet television service to multiple television sets (not shown). The subscriber domain 115 of FIG. 6 also includes the RG 420 to provide devices in the subscriber domain, including the STBs 405-415 and the computing device 105, with access to a communication network, such as the Internet.

Additionally, and unlike the example of FIG. 4, the example subscriber domain 115 of FIG. 6 includes an example context server 605 to provide context service locally at the subscriber domain 115. For example, the context server 605 can cache and provide context information to devices, such as the computing device 105, located in the subscriber domain 115. In some examples, when a device, such as the context server 605, assumes responsibility for providing and maintaining local context service at a subscriber domain, such as the subscriber domain 115, this device also assumes responsibility for updating the master/remote context service 110 with any relevant context changes (e.g., such as changes to the domain's base context). This allow for decentralization of processing during context sessions while maintaining consistent mappings of changes to base context domains for future sessions. As such, the context server 605 can also update context information for the subscriber domain 115, and send the updated context information to the remote context service 110 when appropriate. The context server 605 could be a dedicated server or processing system, such as the processing system 1100 illustrated in FIG. 11, and/or could be implemented by one or more devices already located in the subscriber domain 115.

Flowcharts representative of example processes involving machine readable instructions that may be executed to implement the example computing device 105, the example context service 110, the example application set 205, the example storage 210, the example context client 215, the example context querier 220, the example context configurer 225, the example context provisioner 305, the example storage 310, the example context granter 315, the example context retriever 320 and/or the example interaction processor 325 are shown in FIGS. 7-10. In these examples, the machine readable instructions represented by each flowchart may comprise one or more programs for execution by a processor, such as the processor 1112 shown in the example processing system 1100 discussed below in connection with FIG. 11. Alternatively, the entire program or programs and/or portions thereof implementing one or more of the processes represented by the flowcharts of FIGS. 7-10 could be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-10 may be implemented manually. Further, although the example machine readable instructions are described with reference to the flowcharts illustrated in FIGS. 7-10, many other techniques for implementing the example methods and apparatus described herein may alternatively be used. For example, with reference to the flowcharts illustrated in FIGS. 7-10, the order of execution of the blocks may be changed, and/or some of the blocks described may be changed, eliminated, combined and/or subdivided into multiple blocks.

As mentioned above, the example processes of FIGS. 7-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 7:
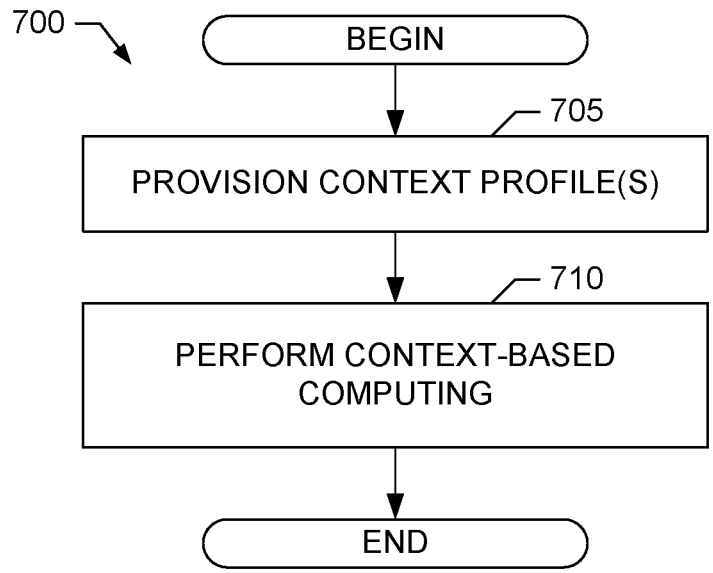
FIG. 7 is a flowchart representative of example machine readable instructions that may be executed to implement context-based computing in the systems of FIGS. 1, 4 and/or 6.

Example machine readable instructions 700 that may be executed to provide context-based computing in the example systems 100, 400 and/or 600 in accordance with the context-based computing framework disclosed herein are illustrated in FIG. 7. With reference to the preceding figures, the example machine readable instructions 700 of FIG. 7 begin execution at block 705 at which the context provisioner 305 included in the context service 110 is invoked to provision one or more context profiles for each of one or more subscriber domains (e.g., such as one or more of the subscriber domains 115-125). At block 710, the context service 110 interacts with the context client(s) 215 of one or more computing device(s) 105 to perform context-based computing, as described above. Although FIG. 7 depicts execution of blocks 705 and 710 as being serial, blocks 705 and 710 can additionally or alternatively be executed in parallel such that, for example, context profile(s) can be provisioned and/or updated for use by the context service 110 while the context service 110 is providing context-based computing services to one or more computing devices 105.

Figure 8:
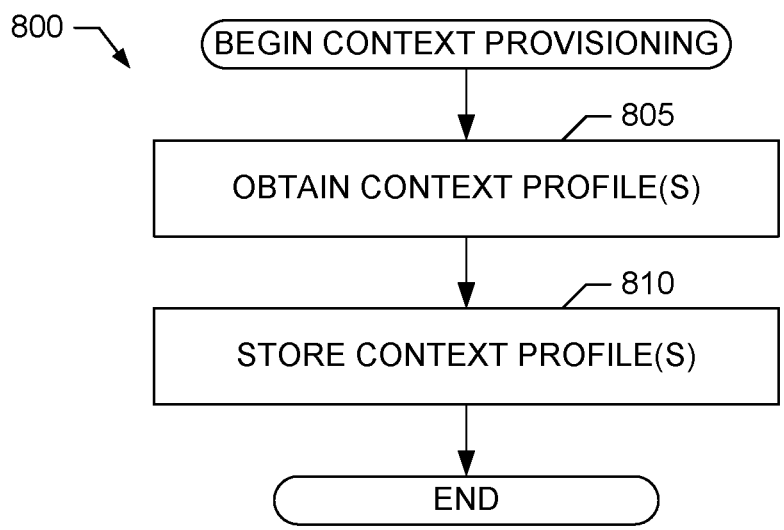
FIG. 8 is a flowchart representative of example machine readable instructions that may be executed to obtain and store context profiles for use by the context service of FIG. 3.

Example machine readable instructions 800 that may be executed to provision context profiles for use by the example context service 110 in accordance with the context-based computing framework disclosed herein are illustrated in FIG. 8. With reference to the preceding figures, the example machine readable instructions 800 of FIG. 8 begin execution at block 805 at which the context provisioner 305 included in the context service 110 is invoked to provision context profile(s) for a subscriber domain, such as the subscriber domain 115. For example, the context provisioner 305 can implement a graphical user interface (GUI) to prompt a user for context profile information, and/or implement a communication interface to receive context profile information in digital format. As described above, a context profile specifies a set of one or more resources (e.g., device(s), service(s), etc.) accessible at the subscriber domain 115 and with which computing devices, such as the computing device 105, may interact. The context profile can also specify resource interaction characteristics for each resource. Resource interaction characteristics can specify, for example, which features of a resource can be accessed (e.g., such as simple channel change and volume change features for a STB, and/or more complex digital video recorder (DVR) features of the STB), types of data that can be exchanged with the resource (such as low resolution media content, or both low and high resolution media content), security requirements, etc. In some examples, for a particular resource, the context profile may specify different roles that computing devices can have when interacting with the resource, with each role being associated with different resource interaction characteristics for interacting with the resource. As described above, the context profile can associate computing devices with particular roles based on, for example, device descriptive information (e.g., describing device capacity, capabilities, etc.), application descriptive information (e.g., describing application(s) executing on the computing device), identity information (e.g., identifying the computing device and/or specific user(s) of the device), etc.

At block 810, the context provisioner 305 stores the context profile(s) obtained at block 805 in the storage 310 included in the context service 110. For example, at block 810 the storage 310 can represent and store the context profile(s) obtained at block 805 using any number and/or types of data formations, data structures, databases, etc., as described above. The context profile(s) stored in the storage 310 can be retrieved by the context service 110 at a later time to provide context-based computing as described herein.

Figure 9:
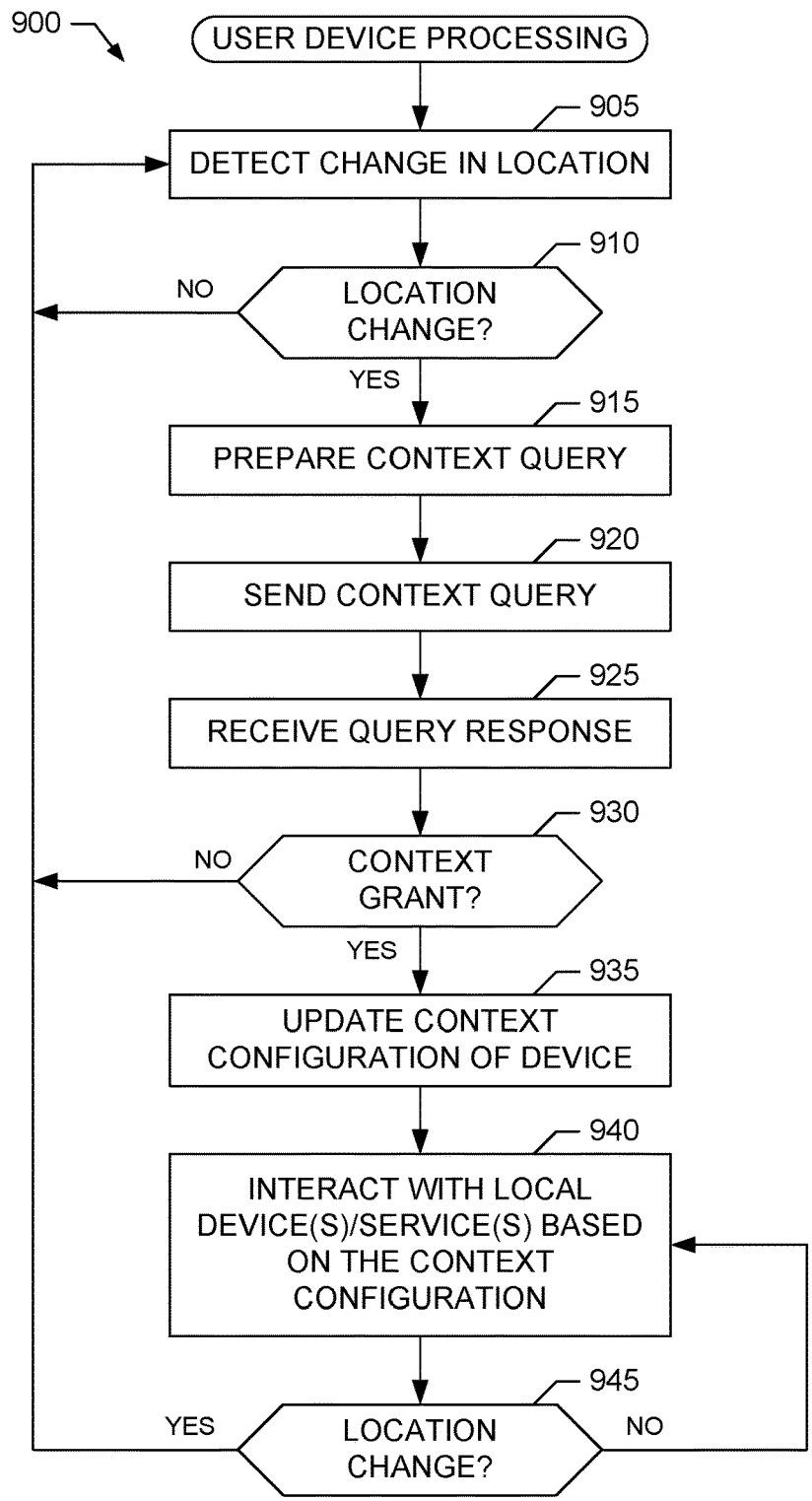
FIG. 9 is a flowchart representative of example machine readable instructions that may be executed to implement the computing device and/or the context client of FIG. 2.

Example machine readable instructions 900 that may be executed to perform context client processing in the example computing device 105 in accordance with the context-based computing framework disclosed herein are illustrated in FIG. 9. For ease of discussion, and without loss of generality, the example machine readable instructions 900 are described in the context of the computing device 105 entering the subscriber domain 115 illustrated in the preceding figures. With reference to the preceding figures, the example machine readable instructions 900 of FIG. 9 begin execution at block 905 at which the context client 215 included in the computing device 105 perform location change detection. For example, the context client 215 can monitor for routing gateway registrations indicating movement to a new subscriber domain, changes in GPS data indicating that the location of the computing device 105 has changed by a least a threshold distance, etc.

If a location change is detected (block 910), then at block 915 the context querier 220 included in the context client 215 of the computing device 105 prepares a context query, such as the context query 510. For example, at block 915 the context querier 220 can prepare query information that describes the computing device 105 for inclusion in the context query 510. As described above, the query information can include, for example, device descriptive information, application descriptive information, identity information, etc.

At block 920, the context querier 220 sends the context query 510 prepared at block 915 to the context service 110 (or, in some examples, the context server 605 providing context services locally at the subscriber domain 115). For example, the context querier 220 may be pre-configured with a network address for accessing the context service 110, and/or may query a domain name system (DNS) or similar system to obtain the network address for accessing the context service 110, etc. Additionally or alternatively, when registering with the RG 420, the context client 215 may determine the presence of the local context server 605 and configure the context querier 220 to send context queries to the local context server 605 instead of, or in addition to, sending the queries to the remote context service 110.

At block 925, the context querier 220 receives a response to the context query 510 sent at block 930. For example, the response can correspond to the context grant 530 if the context query 510 is successfully authenticated by the context service 110. Alternatively, the response can correspond to a context denial or similar message if, for example, authentication of the context query 510 is unsuccessful or otherwise not accepted by the context service 110.

If the received response is the context grant 530 (block 930), then at block 935 the context configurer 225 included in the context client 215 of the computing device 105 extracts or otherwise obtains the context information included in the received query response, and uses the context information to update the context configuration of the computing device 105. For example, the context configurer 225 can translate the context information into configuration data for configuring/adapting one or more applications executing on the computing device to recognize the resource(s) specified in the context information. The context configurer 225 may also configure these application(s) to provide resource interface(s) consistent with the resource interaction characteristics included in the context information. For example, the context configurer 225 may configure an interface of an application to provide access to a subset of features, data, etc., of a resource in accordance with the resource interaction characteristics specified for this resource in the received context information.

At block 940, the computing device 105 interacts with the local resource(s) (e.g., local device(s), service(s), etc.) based on the context configuration performed at block 935 by the context configurer 225. For example, the computing device 105 may interact with devices, such as the STBs 405-415 described above, the instructor's computing device described above, etc., and/or network-based services accessible at and tailored to the subscriber location 115, etc. In some examples, the context configure 225 may communicate with the context service 110 to initially establish interactions with one or more of these resources (e.g., such as when a resource does not recognize the computing device 105 until commanded by the context service 110). Context-based computing continues at block 940 until the context client 215 detects another location change (block 945), in which case the processing of FIG. 9 repeats for the new location.

Figure 10:
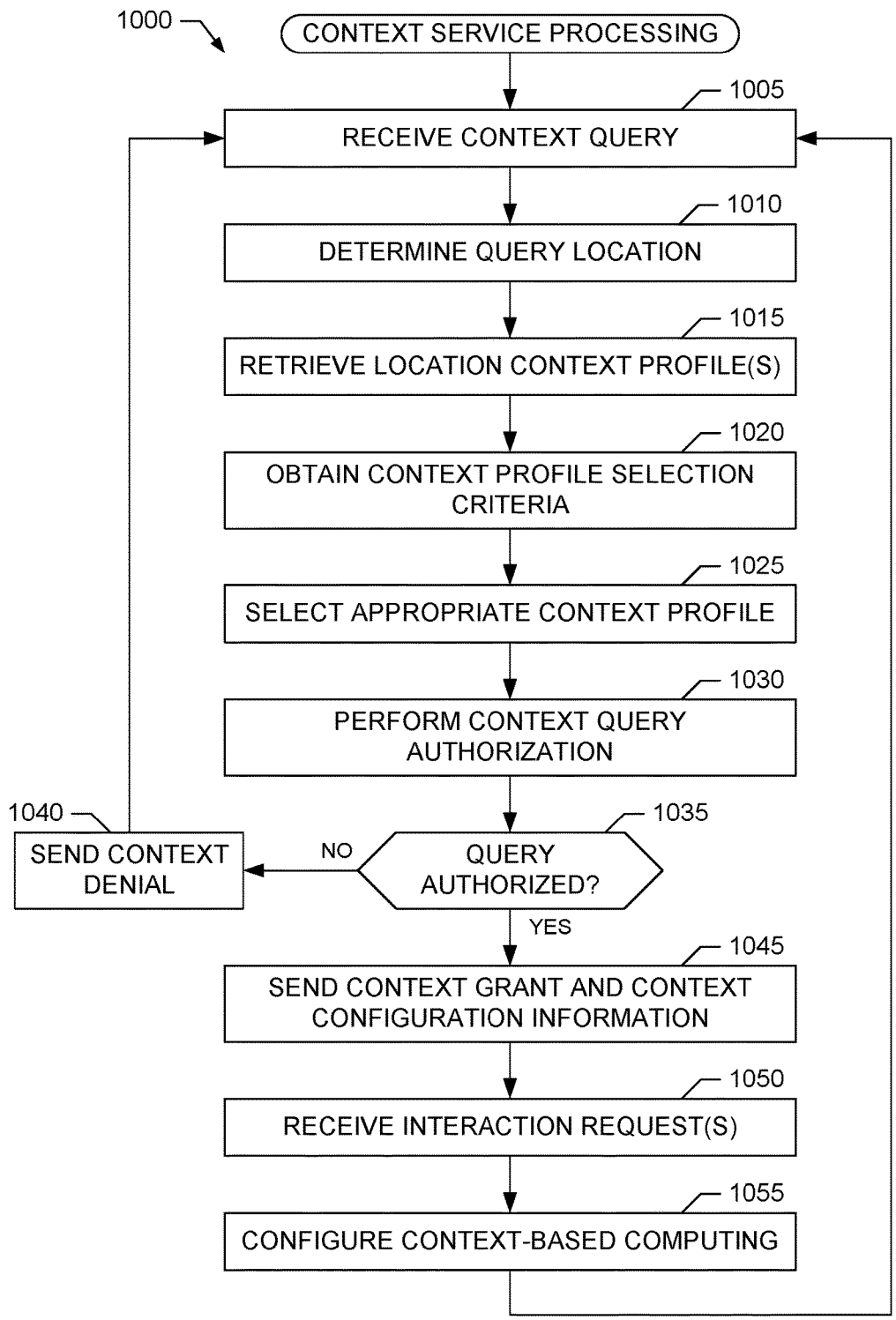
FIG. 10 is a flowchart representative of example machine readable instructions that may be executed to implement the context service of FIG. 3.

Example machine readable instructions 1000 that may be executed to implement the example context service 110 in accordance with the context-based computing framework disclosed herein are illustrated in FIG. 10. For ease of discussion, and without loss of generality, the example machine readable instructions 1000 are described in the context of the context service 110 provided context-based computing for the computing device 105 in the subscriber domain 115 illustrated in the preceding figures. With reference to the preceding figures, the example machine readable instructions 1000 of FIG. 10 begin execution at block 1005 at which the context granter 315 of the context service 110 receives a context query, such as the context query 510, from the computing device 105. At block 1010, the context retriever 320 of the context service 110 determines a location associated with the context query 510 received at block 1005 (and, by extension, the location of the computing device 105 that sent the query). For example, the context retriever 320 can determine the location of the context query 510 from location data (e.g., GPS data) included in the query, an originating address (e.g., originating IP address) for the query, etc.

At block 1015, the context retriever 320 retrieves from the storage 310 one or more context profiles associated with the location determined at block 1010. Assuming that the location corresponds to the subscriber domain 115, the context retriever 320 retrieves the context profile(s) provisioned for the subscriber domain 115. Assuming multiple context profiles are retrieved, at block 1020 the context retriever 320 obtains selection criteria for selecting one of the context profiles. For example, the selection criteria can correspond to a current time if different context profiles are to be active at different times. Additionally or alternatively, the selection criteria can correspond to, for example, application descriptive information included in the context query 510, device descriptive information included in the context query 510, identification information included in the context query 510, etc., which are compared to user preferences and/or role information specified for each context profile. At block 1025, the context retriever 320 selects a context profile from the context profiles retrieved at block 1015 using the selection criteria determined at block 1020.

At block 1030, the context granter 315 authenticates the context query 510 based on information included in the query, as described above. If query authorization is unsuccessful (block 1035), then at block 1040 the context granter 315 returns a context denial message to the computing device 105 that sent the context query 510. However, if query authorization is successful (block 1035), then at block 1045 the context granter 315 returns a context grant message, such as the context grant 530, to the computing device 105 that sent the context query 510. The context grant 530 also includes context information for the subscriber domain 115 that is relevant to the particular computing device 105 that sent the context query 510. For example, and as described above, the context retriever 320 can determine a role (or role classification) for the computing device 105 based on information included in the context query 510 and obtain context information relevant to the determined role from the context profile selected at block 1025. As described above, the context-aware computing device 105 uses the returned context information to configure interaction with the resource(s) at the subscriber domain 115 that are specified in the context information.

Sometime later, at block 1050 the interaction processor 325 of the context service 110 receives one or more interactions requests, such as the interaction requests 545, from the computing device 105 indicating that the computing device 105 is requesting to interact with one or more resources specified in the context information returned at block 1045. At block 1055, the interaction processor 325 configures context-based computing with the requested resource(s) by, for example, issuing one or more commands to the resource(s) instructing them to recognize and accept communications from the computing device 105.

Figure 11:
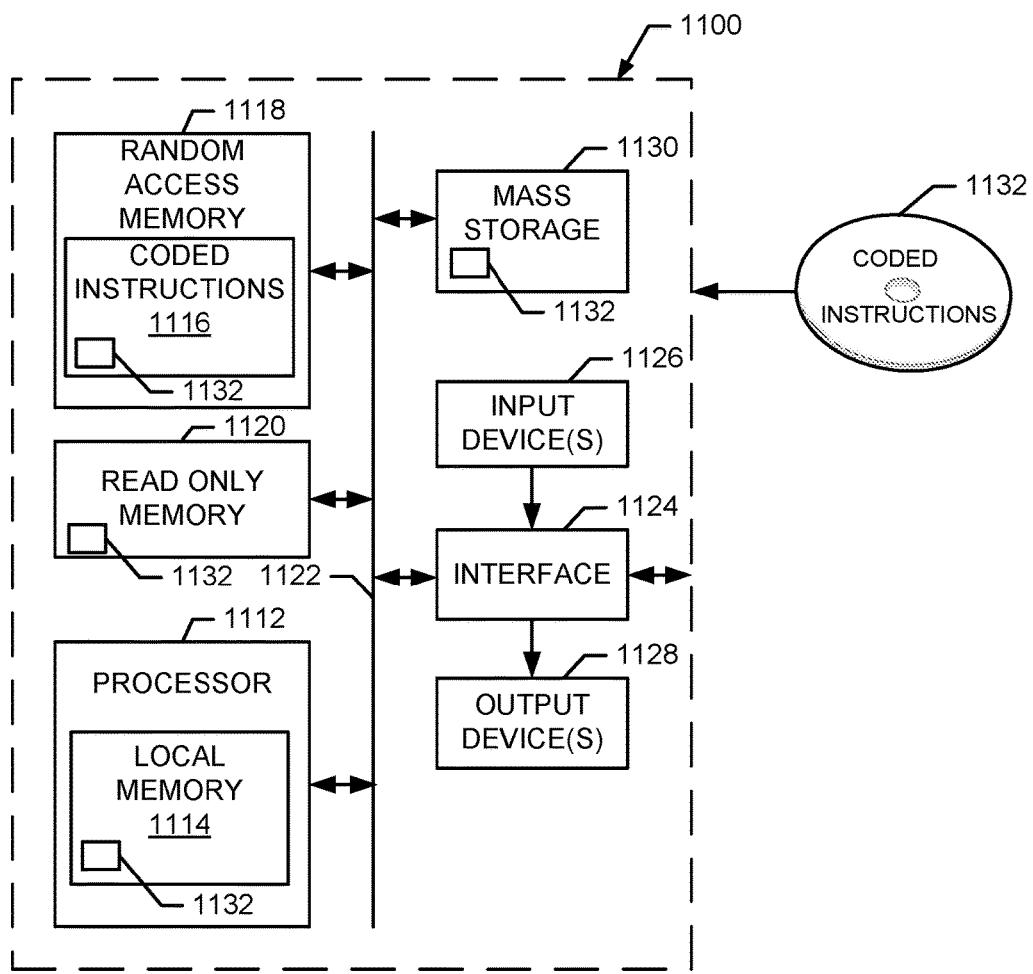
FIG. 11 is a block diagram of an example processing system that may execute the example machine readable instructions of FIGS. 7-9 and/or 10 to implement the systems of FIGS. 1, 4 and/or 6, the computing device and/or the example context client of FIG. 2, and/or the context service of FIG. 3.

FIG. 11 is a block diagram of an example processing system 1100 capable of implementing the apparatus and methods disclosed herein. The processing system 1100 can be, for example, a server, a personal computer, a mobile phone/smartphone, a personal digital assistant (PDA), an Internet appliance, a set top box, a DVD player, a DVR, or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, the machine readable instructions represented in FIGS. 7-10. The processor 1112 may be any type of processing unit, such as one or more microprocessors, one or more microcontrollers, etc.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the storage 210 and/or the storage 310. Additionally or alternatively, in some examples the volatile memory 1118 may implement the storage 210 and/or the storage 310.

The coded instructions 1132 of FIGS. 7-10 may be stored in the mass storage device 1130, in the volatile memory 1118, in the non-volatile memory 1120, in the local memory 1114 and/or on a removable storage medium, such as a CD or DVD 1132.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to provision a context profile for use in context-based computing, the method comprising:
   creating, by executing an instruction with a processor, a context profile associated with a first location, the context profile containing context information identifying a computing resource available at the first location, the context information further specifying at least a first set of features of the computing resource permitted to be accessed by devices having a first set of device capabilities and a second set of features of the computing resource permitted to be accessed by devices having a second set of device capabilities, the second set of device capabilities different than the first set of device capabilities, the second set of features different than the first set of features; and
   enabling access to the context profile by an electronic device having a device location corresponding to the first location in response to a query from the electronic device, the query containing a request for the context information.

2. The method of claim 1, further including determining the device location from an originating address of the query, the originating address associated with a routing gateway.

3. The method of claim 1, further including determining the device location from global positioning system data included in the query.

4. The method of claim 1, further including determining the device location from at least one of information identifying the electronic device and information referencing an address associated with the electronic device.

5. The method of claim 1, wherein the context profile is a first context profile active at a first time, the query is a first query, the computing resource is a first computing resource, the context information is first context information, and further including:
   creating a second context profile containing second context information for the first location, the second context profile being active at a second time; and
   transmitting the second context information to the electronic device in response to a second query received from the electronic device at the second time when the device location of the electronic device corresponds to the first location, the context information identifying a second computing resource associated with the first location, and the second context information to enable configuration of interaction between the electronic device and the second computing resource.

6. The method of claim 5, wherein the second query includes identity information, and further including:
   processing the identity information to determine whether the second query is authorized; and
   transmitting the second context information to the electronic device if the second query is determined to be authorized, but not transmitting the context information to the electronic device if the second query is not determined to be authorized.

7. A computer readable storage device including computer readable instructions which, when executed, cause a processor to perform operations comprising:
   creating a context profile associated with a first location, the context profile containing context information identifying a computing resource associated with the first location, the context information further specifying at least a first set of features of the computing resource permitted to be accessed by devices having a first set of device capabilities and a second set of features of the computing resource permitted to be accessed by devices having a second set of device capabilities, the second set of device capabilities different than the first set of device capabilities, the second set of features different than the first set of features; and enabling access to the context profile by an electronic device having a device location corresponding to the first location in response to a query from the electronic device, the query containing a request for the context information.

8. The computer readable storage device of claim 7, wherein the operations further include determining the device location from an originating address of the query, the originating address associated with a routing gateway.

9. The computer readable storage device of claim 7, wherein the operations further include determining the device location from global positioning system data included in the query.

10. The computer readable storage device of claim 7, wherein the operations further include determining the device location from at least one of information identifying the electronic device and information referencing an address associated with the electronic device.

11. The computer readable storage device of claim 7, wherein the context profile is a first context profile active at a first time, the query is a first query, the computing resource is a first computing resource, the context information is first context information, and the operations further include:

creating a second context profile containing second context information for the first location, the second context profile being active at a second time; and transmitting the second context information to the electronic device in response to a second query received from the electronic device at the second time when the device location of the electronic device corresponds to the first location, the context information identifying a second computing resource associated with the first location, and the second context information to enable configuration of interaction between the electronic device and the second computing resource.

12. The computer readable storage device of claim 11, wherein the second query includes identity information, and the operations further include:

processing the identity information to determine whether the second query is authorized; and transmitting the second context information to the electronic device if the second query is determined to be authorized, but not transmitting the context information to the electronic device if the second query is not determined to be authorized.

13. The computer readable storage device of claim 7, wherein the query information includes device descriptive information, and the operations further include:

processing the device descriptive information to determine a role associated with the electronic device for interacting with the computing resource; and determining the context information from the context profile based on the role.

14. An apparatus comprising:
memory including machine readable instructions; and
a processor to execute the machine readable instructions to perform operations including:

creating a context profile associated with a first location, the context profile containing context information identifying a computing resource associated with the first location, the context information further specifying at least a first set of features of the computing resource permitted to be accessed by devices having a first set of device capabilities and second set of features of the computing resource permitted to be accessed by devices having a second set of device capabilities, the second set of device capabilities different than the first set of device capabilities, the second set of features different than the first set of features; and enabling access to the context profile by an electronic device having a device location corresponding to the first location in response to a query from the electronic device, the query containing a request for the context information.

15. The apparatus of claim 14, wherein the operations further include determining the device location from an originating address of the query, the originating address associated with a routing gateway.

16. The apparatus of claim 14, wherein the operations further include determining the device location from global positioning system data included in the query.

17. The apparatus of claim 14, wherein the operations further include determining the device location from at least one of information identifying the electronic device and information referencing an address associated with the electronic device.

18. The apparatus of claim 14, wherein the context profile is a first context profile active at a first time, the query is a first query, the computing resource is a first computing resource, the context information is first context information, and the operations further include:

creating a second context profile containing second context information for the first location, the second context profile being active at a second time; and transmitting the second context information to the electronic device in response to a second query received from the electronic device at the second time when the device location of the electronic device corresponds to the first location, the context information identifying a second computing resource associated with the first location, and the second context information to enable configuration of interaction between the electronic device and the second computing resource.

19. The apparatus of claim 14, wherein the query information includes device descriptive information, and the operations further include:

processing the device descriptive information to determine a role associated with the electronic device for interacting with the computing resource; and determining the context information from the context profile based on the role.

20. The apparatus of claim 19, wherein the device descriptive information includes a computing capacity of the electronic device.

* * * * *